US011640453B2

(12) United States Patent
Gorsica, IV et al.

(10) Patent No.: US 11,640,453 B2
(45) Date of Patent: May 2, 2023

(54) USER AUTHENTICATION FACILITATED BY AN ADDITIONAL DEVICE

(71) Applicant: Motorola Mobility LLC, Chicago, IL (US)

(72) Inventors: John J. Gorsica, IV, Round Lake, IL (US); Rachid M. Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 575 days.

(21) Appl. No.: 16/730,439

(22) Filed: Dec. 30, 2019

(65) Prior Publication Data

US 2021/0200854 A1   Jul. 1, 2021

(51) Int. Cl.
G06F 21/34 (2013.01)
G06F 21/78 (2013.01)
G06F 21/62 (2013.01)
G06F 21/41 (2013.01)

(52) U.S. Cl.
CPC .............. G06F 21/34 (2013.01); G06F 21/41 (2013.01); G06F 21/62 (2013.01); G06F 21/78 (2013.01)

(58) Field of Classification Search
CPC ...................................................... G06F 21/34
See application file for complete search history.

(56) References Cited

U.S. PATENT DOCUMENTS

| 8,107,927 | B2 | 1/2012 | Sivaram et al. | |
|---|---|---|---|---|
| 9,047,473 | B2 * | 6/2015 | Samuelsson | G06F 21/60 |
| 9,367,672 | B2 | 6/2016 | Eggerton et al. | |
| 9,497,202 | B1 | 11/2016 | Calo et al. | |
| 9,524,631 | B1 | 12/2016 | Agrawal et al. | |
| 9,648,088 | B1 | 5/2017 | Pande et al. | |
| 9,858,559 | B2 | 1/2018 | Raleigh et al. | |
| 11,284,264 | B2 | 3/2022 | Corsica et al. | |
| 2002/0095584 | A1 * | 7/2002 | Royer | H04L 63/168 |
| | | | | 713/183 |
| 2003/0215114 | A1 * | 11/2003 | Kyle | G06V 10/94 |
| | | | | 382/115 |
| 2008/0101658 | A1 * | 5/2008 | Ahern | G06K 9/6217 |
| | | | | 382/115 |

(Continued)

FOREIGN PATENT DOCUMENTS

WO   WO-2009070430 A2 *   6/2009   ........... G06Q 20/223

OTHER PUBLICATIONS

"Corrected Notice of Allowability", U.S. Appl. No. 16/730,476, dated Jan. 5, 2022, 3 pages.

(Continued)

*Primary Examiner* — Ponnoreay Pich
(74) *Attorney, Agent, or Firm* — FIG. 1 Patents

(57) ABSTRACT

In aspects of user authentication facilitated by an additional device, a computing device can maintain authentication data usable to authenticate a user to use the computing device. The computing device implements an authentication control module that can determine an additional device is equipped to facilitate authentication of a user to the computing device. The authentication control module can then receive additional authentication data associated with the user from the additional device, and authenticate the user to use the computing device based in part on the additional authentication data received from the additional device.

20 Claims, 5 Drawing Sheets

(56) References Cited

U.S. PATENT DOCUMENTS

| | | | |
|---|---|---|---|
| 2008/0118013 | A1 | 5/2008 | Vis et al. |
| 2009/0300744 | A1 | 12/2009 | Guo |
| 2010/0235881 | A1 | 9/2010 | Liu et al. |
| 2010/0274569 | A1 | 10/2010 | Reudink |
| 2011/0075191 | A1 | 3/2011 | Meunier et al. |
| 2011/0221568 | A1* | 9/2011 | Giobbi .................. H04W 12/06 340/5.82 |
| 2012/0019379 | A1 | 1/2012 | Ben Ayed |
| 2013/0036458 | A1* | 2/2013 | Liberman ........... H04L 63/0861 726/5 |
| 2013/0047206 | A1* | 2/2013 | Radhakrishnan ....... G06F 21/34 726/1 |
| 2013/0079059 | A1 | 3/2013 | Huslak |
| 2013/0145457 | A1 | 6/2013 | Papakipos et al. |
| 2014/0009421 | A1* | 1/2014 | Lee ......................... G06F 3/041 345/173 |
| 2014/0037243 | A1 | 2/2014 | Lee et al. |
| 2015/0022439 | A1* | 1/2015 | Alameh .................. G06F 3/017 345/156 |
| 2015/0077228 | A1 | 3/2015 | Dua |
| 2015/0101025 | A1 | 4/2015 | Murata et al. |
| 2016/0292404 | A1 | 10/2016 | Tseng et al. |
| 2016/0308859 | A1* | 10/2016 | Barry ................... G06V 40/172 |
| 2017/0156026 | A1 | 6/2017 | Reudink |
| 2017/0300678 | A1 | 10/2017 | Metke et al. |
| 2018/0091538 | A1 | 3/2018 | Narayanan et al. |
| 2018/0173403 | A1 | 6/2018 | Carbune et al. |
| 2019/0120088 | A1 | 4/2019 | Ostrom et al. |
| 2020/0327458 | A1 | 10/2020 | Dutt et al. |

OTHER PUBLICATIONS

"Notice of Allowance", U.S. Appl. No. 16/730,476, dated Dec. 14, 2021, 9 pages.

"Facial Recognition—Axis Communications", Retrieved at: https://www.axis.com/en-us/solutions-by-application/facial-recognition—on Aug. 27, 2019, 2 pages.

"Dual SIM Switch Widget—Google Play App", Retrieved at: https://play.google.com/store/apps/details?id=rs.org.nopo.dualsimcontrol&hl=en_US—on Aug. 27, 2019, 3 pages.

"Use a Chromebook as a guest—Chromebook Help", Retrieved at: https://support.google.com/chromebook/answer/10570907hl=en—on Aug. 27, 2019, 3 pages.

"RSA SECURID Hardware Tokens—Security tokens for identity and access management", Retrieved at: https://www.rsa.com/en-us/products/rsa-securid-suite/rsa-securid-access/securid-hardware-tokens—on Aug. 27, 2019, 4 pages.

"Geofencing & GPS Tracking—AMTEL", Retrieved at: http://www.amtelnet.com/solutions/mobile-security/geofencing-gps-tracking/—on Aug. 27, 2019, 8 pages.

"BioID Facial Recognition App with face login", Retrieved at: https://www.bioid.com/facial-recognition-app/—on Aug. 27, 2019, 8 pages.

Saluste,"Windows Welcome/Lock Screen, User Switching and Shutdown Options", Retrieved at: https://www.winhelp.us/windows-basics.html, Apr. 5, 2019, 8 pages.

"Final Office Action", U.S. Appl. No. 16/730,242, dated Oct. 15, 2020, 17 pages.

"Final Office Action", U.S. Appl. No. 16/730,476, dated Aug. 27, 2020, 11 pages.

"Non-Final Office Action", U.S. Appl. No. 16/730,941, dated Jul. 30, 2020, 10 pages.

"Non-Final Office Action", U.S. Appl. No. 16/730,476, dated Jun. 18, 2020, 11 pages.

"Corrected Notice of Allowability", U.S. Appl. No. 16/730,941, dated Sep. 9, 2021, 3 pages.

"Final Office Action", U.S. Appl. No. 16/730,476, dated Jul. 8, 2021, 15 pages.

"Notice of Allowance", U.S. Appl. No. 16/730,941, dated Jul. 13, 2021, 8 pages.

"Non-Final Office Action", U.S. Appl. No. 16/730,242, dated Mar. 6, 2020, 12 pages.

"Final Office Action", U.S. Appl. No. 16/730,941, dated Jan. 7, 2021, 11 pages.

"Non-Final Office Action", U.S. Appl. No. 16/730,476, dated Mar. 4, 2021, 12 pages.

"Notice of Allowance", U.S. Appl. No. 16/730,242, dated Mar. 9, 2021, 19 pages.

\* cited by examiner

USER AUTHENTICATION FACILITATED BY AN ADDITIONAL DEVICE

BACKGROUND

Devices such as smart devices, mobile devices (e.g., cellular phones, tablet devices), consumer electronics, and the like can be implemented for use in a wide range of environments and for a variety of different applications. Given today's reliance on these devices, many people own multiple devices. For example, a typical living room may have a smart TV, a tablet, a laptop, and multiple mobile phones all within proximity to one another. Device owners may only want certain people to access these devices for any number of reasons. For instance, many of these devices store personal information about the people who own them. Thus, to maintain privacy, a device owner may only want to allow certain authenticated users to access and use these devices.

In some instances, these devices may be capable of authenticating users. For example, a device may require a user to be authenticated via an authentication method such as, password input, voice recognition, facial recognition, fingerprint recognition, etc. As a result, the device may store corresponding identifiable information, such as passwords, voice data, facial data, fingerprint data, etc. of the user. Once a device receives identifiable information from a user that corresponds to the identifiable information stored on the device, the user may be allowed to access and use the device.

However, some of these devices are not capable of authenticating users, which may be because a device is not able to perform an authentication method. For instance, a smart TV may not be capable of facial recognition or voice recognition because it does not have a camera or a microphone, and a laptop may not be capable of fingerprint recognition because it does not have a fingerprint reader. Additionally, a device may not be capable of authenticating users because it does not store identifiable information about the user. By way of example, a device having a camera is still not capable of authenticating a user via facial recognition if it does not store the requisite facial data. Thus, conventional devices which are not able to perform an authentication method and/or do not store identifiable information about a user are not capable of user authentication.

BRIEF DESCRIPTION OF THE DRAWINGS

Implementations of the techniques for user authentication facilitated by an additional device are described with reference to the following Figures. The same numbers may be used throughout to reference like features and components shown in the Figures.

DETAILED DESCRIPTION

Figure 1:
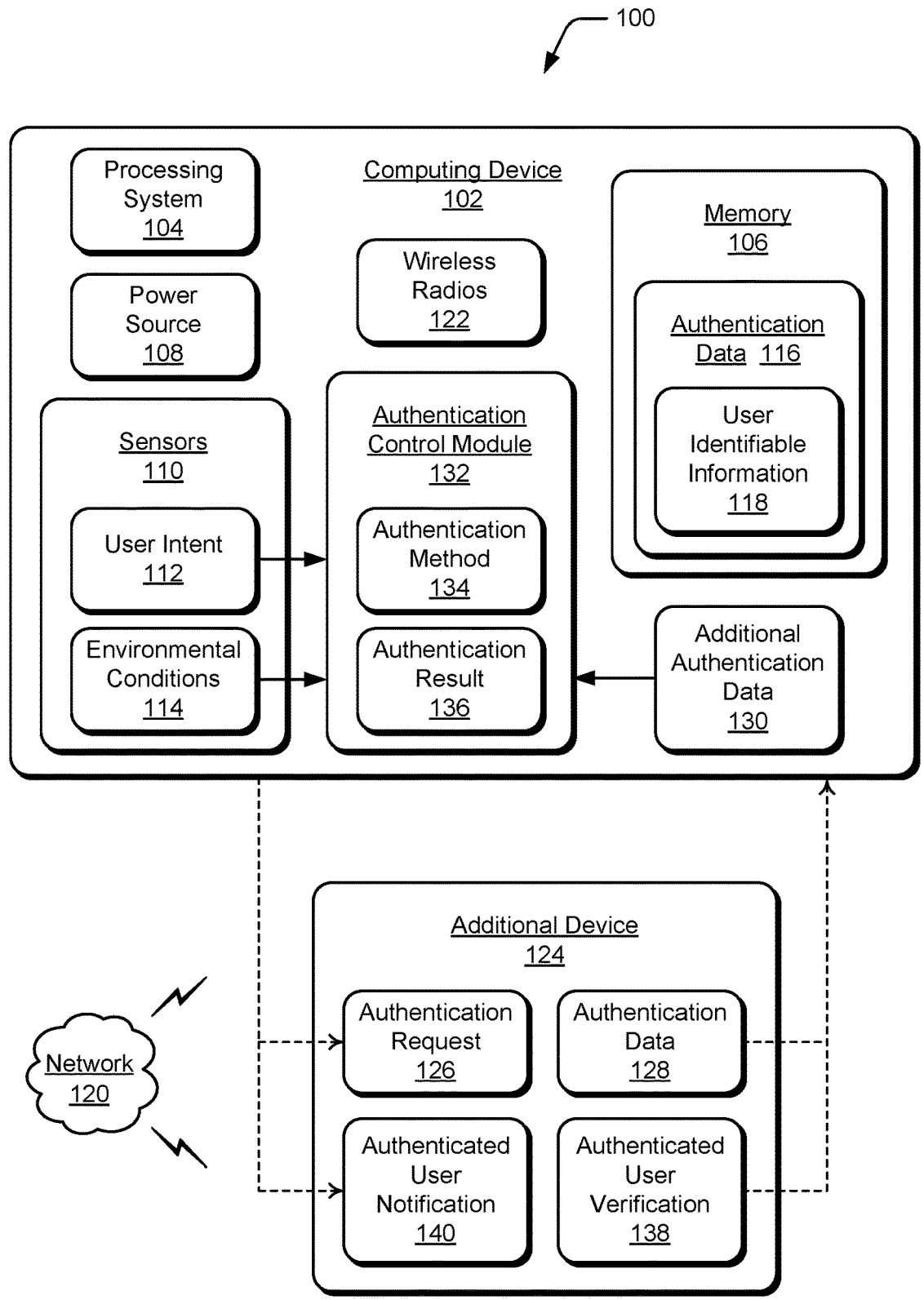
FIG. 1 illustrates an example of devices that can be used to implement techniques of user authentication facilitated by an additional device as described herein.

Implementations of user authentication facilitated by an additional device are described, and provide techniques to facilitate authentication of a user to use a computing device using authentication data captured by sensors of an additional device. For example, a certain number of users (e.g., members of a family) may be verified to use a computing device, and the computing device may store user identifiable information associated with each of the verified users, such as facial recognition data, fingerprint data, voice data, etc. Thus, in response to receiving an indication of user intent to use the computing device, the computing device may attempt to authenticate the user as being one of the verified users. This authentication may be performed by receiving authentication data from the user who intends on using the computing device, such as via sensors, a camera, a microphone, a fingerprint reader, and/or any other type of authentication data input device. The authentication data that is received from the user may then be compared to the user identifiable information stored on the computing device. If the authentication data received from the user matches the identifiable information stored on the computing device, then the user may be authenticated to use the computing device. Alternatively, if the authentication data received from the user does not match the identifiable information stored on the computing device, the user may not be authenticated to use the computing device.

However, the computing device may not be capable of collecting the needed authentication data from the user, or the computing device may not have the sensor available or operational to perform a certain authentication method. For example, the computing device may store facial recognition data associated with the user, but may not be able to use a camera in a dark environment that would be needed to capture an image of the user and perform the authentication method of facial recognition. Similarly, other environmental conditions may prevent the computing device from collecting authentication data from the user. For example, the computing device may store voice data associated with the user and have a microphone to capture voice authentication data for performing authentication of the user by way of voice recognition. However, the computing device may be located in a noisy environment and unable to collect the voice authentication data from the user.

In aspects of user authentication facilitated by an additional device as described herein, a computing device can maintain authentication data usable to authenticate a user to use the computing device. The computing device implements an authentication control module that can determine whether an additional device is equipped to facilitate authentication of a user to the computing device. The authentication control module can then receive the authentication data, or additional authentication data, from the additional device to facilitate authentication of the user to use the computing device. Thus, the computing device may rely on an additional device to collect authentication data from the user so as to authenticate the user to the computing device. In implementations, the authentication control module can determine whether the computing device and/or the additional device collects authentication data from the user based on proximity to the user, obstruction of the sensors due to environmental conditions, the capability of the device hardware, etc. As such, the context of each device can be used in determining which authentication method to use, and which device collects the authentication data.

The authentication control module implemented by the computing device may also collect or receive authentication data from both the computing device and the additional device. For example, the computing device may be capable of collecting facial recognition authentication data from the user, and an additional device may be capable of collecting fingerprint authentication data from the user. The authentication control module can then initiate to use both types of the authentication data to perform diversity authentication of the user for extra security. In other aspects, the authentication control module of the computing device may automatically authenticate the user to the computing device if a trusted device is detected. For example, the authentication control module may verify a wearable device as belonging to a verified user. This usually entails entering user credentials on the device while wearing it. Thus, when the authentication control module receives data communications or other data signals from the wearable device, the user may be authenticated to use the computing device based on the trusted wearable device.

While features and concepts of user authentication facilitated by an additional device can be implemented in any number of different devices, systems, environments, and/or configurations, implementations of user authentication facilitated by an additional device are described in the context of the following example devices, systems, and methods.

FIG. 1 illustrates an example 100 of a computing device 102 that can be used to implement techniques of user authentication facilitated by an additional device, as described herein. In this example 100, the computing device 102 may be any type of a computing device, tablet device, mobile phone, flip phone, smart watch, a smart TV, a companion device that may be paired with other mobile devices, and/or any other type of mobile device. Generally, the computing device 102 may be any type of an electronic and/or computing device implemented with various components, such as a processing system 104 and memory 106, as well as any number and combination of different components as further described with reference to the example device shown in FIG. 5. For example, the computing device 102 can include a power source 108 to power the device, such as a rechargeable battery and/or any other type of active or passive power source that may be implemented in an electronic and/or computing device.

The computing device 102 may also include sensors 110, which are used to sense or detect an indication of user intent 112 to use the computing device 102. By way of example, the sensors 110 may sense that a user is within a close proximity (e.g., within a threshold proximity) of the computing device 102, from which a determination can be made that the user wishes to use the computing device 102. Other indications of user intent 112 may include user actions or commands, such as a voice command, a touch command, walking in and/or turning the lights on in the room where the computing device 102 is located, or any other indication or communication of user intent 112 to use the computing device 102.

Moreover, the sensors 110 may detect one or more environmental conditions 114 associated with an environment in which the computing device 102 is located. For example, the sensors 110 may detect noise above a threshold level and determine that the computing device 102 is in a noisy environment. Alternatively or in addition, the sensors 110 may detect that the amount of light in the environment is below a threshold level and determine that the computing device 102 is in a dark environment. Thus, the sensors 110 may detect environmental conditions 114 that correspond to an amount of noise, an amount of light, or any other environmental conditions 114 associated with the environment in which the computing device 102 is located.

The memory 106 of the computing device 102 may also store authentication data 116 associated with a user, or users of the device. The authentication data 116 is data that may be used to authenticate a user to use the computing device 102. For example, the authentication data 116 may be user identifiable information 118 associated with a user that has been authorized to use the computing device 102, for example, by the owner of the computing device 102. The computing device 102 may also receive identifiable information from a user to compare to the user identifiable information 118 stored on the computing device. If the identifiable information received from the user matches the user identifiable information 118 stored on the computing device 102, then a user may be authenticated to use the computing device 102. The user identifiable information 118 may be biometric information associated with an authorized user, including, but not limited to, facial information, iris information, voice information, fingerprint information, and/or hand geometry. The computing device 102 may also store the authentication data 116 associated with multiple users that have been authorized to use the computing device 102.

In implementations, the computing device 102 can communicate with other devices via a network 120 (e.g., LTE, WLAN, etc.) or via a direct peer-to-peer connection (e.g., Wi-Fi Direct, Bluetooth™, Bluetooth LE (BLE), RFID, NFC, etc.). The computing device 102 can include wireless radios 122 that facilitate wireless communications, as well as communication interfaces that facilitate network communications. The computing device 102 can be implemented for data communication between devices and network systems via the network 120, which can be represented or otherwise implemented as a combination of two or more networks. The network 120 may include wired and/or wireless networks implemented using any type of network topology and/or communication protocol, to include IP based networks, and/or the Internet, as well as networks that are managed by mobile network operators, such as a communication service providers, mobile phone providers, and/or Internet service providers.

For example, the network 120 may facilitate communication between the computing device 102 and an additional device 124. The computing device 102 and the additional device 124 may be implemented for trusted pairing with each other directly, or through a trusted cloud and/or network connection. Similar to the computing device 102, the additional device 124 may be any type of a computing device, tablet device, mobile phone, smart watch, a smart TV, a companion device that may be paired with other mobile devices, an IoT (Internet-of-things) device, a camera device, and/or any other type of computing device. The additional device 124 also includes various components, such as a processing system, a memory, as well as any number and combination of different components described with reference to the example device shown in FIG. 5.

In this example 100, the additional device 124 may be representative of a network of additional devices that can be implemented for various different radio-based, wireless signaling, such as with LTE, Near Field Communication (NFC), Real-time Locating System (RTLS), Bluetooth™ devices, and the like. In this example, the environment may also include Internet-of-things (IoT) networked devices, Wi-Fi connected devices, and/or additional mobile, electronic, camera, and/or computing devices. The IoT devices may also include motion sensors, monitoring devices, control devices, and any other type of networked computing and/or electronic devices.

In some instances, such as due to environmental conditions or other factors, the computing device 102 may not be able to authenticate a user to use the computing device 102. In one example, the computing device 102 may store the authentication data 116 associated with the user, but the computing device may not have the sensor 110 needed to collect identifiable information to compare to the user identifiable information 118 stored on the computing device 102. However, the additional device 124 may include different sensors and/or sensors similar to those described in relation to sensors 110 of the computing device 102, and thus, may be equipped with the needed sensor. Accordingly, the computing device 102 may communicate an authentication request 126 to the additional device 124, which can then collect authentication data 128 from or about the user using its own device sensors and communicate the collected authentication data 128 back to the computing device 102. Accordingly, the computing device 102 receives the additional authentication data 130 from the additional device 124. The computing device 102 may then use the additional authentication data 130 to assist in authenticating the user to use the computing device 102.

In implementations, the computing device 102 and the additional device 124 may be in close proximity to each other to facilitate authentication of the user to use the computing device 102. Thus, proximity information may be determined via wireless ranging techniques implemented by the sensors 110 of the computing device 102 and sensors of the additional device 124, such as RSSI (received signal strength indication) between the computing device 102 and the additional device 124, TOF (time-of-flight) between the devices, beacon reception, proximity to a WiFi access point to which both the computing device 102 and the additional device 124 are connected, etc. The proximity information may also be determined by absolute position of the computing device 102 and the additional device 124, for example using GPS (global positioning system) or any other type of location and/or positioning system. In other implementations, the additional device 124 may be a remote device with reference to the location of the device relative to the computing device 102. In this example, the computing device 102 may maintain a network connection to the additional device 124 at any distance, such as via an access point in a local network system or via other network configurations that facilitate data communication between the devices. As such, the computing device 102 may submit the authentication request 126 to the additional device 124 even if the computing device 102 and the additional device 124 are not in close proximity.

In this example 100, the computing device 102 includes an authentication control module 132 that implements features of user authentication facilitated by an additional device, as described herein. The authentication control module 132 may be implemented as a module that includes independent processing, memory, and logic components functioning as a computing and/or electronic device integrated with the computing device 102. Alternatively or in addition, the authentication control module 132 can be implemented as a software application or software module, such as with the operating system and as computer-executable software instructions that are executable with a processor (e.g., with the processing system 104) of the computing device 102. As a software application or module, the authentication control module 132 can be stored on computer-readable storage memory (e.g., the memory 106 of the device), or any other suitable memory device or electronic data storage implemented with the authentication control module 132. Alternatively or in addition, the authentication control module 132 may be implemented in firmware and/or at least partially in computer hardware. For example, at least part of the authentication control module 132 may be executable by a computer processor, and/or at least part of the invention module may be implemented in a hardware circuit.

The authentication control module 132 is implemented to receive an indication of user intent 112 to use the computing device 102. As noted above, sensors 110 of the computing device 102 may be implemented to detect the user intent 112 to use the computing device 102. By way of example, an indication of user intent 112 may be received when the sensors 110 detect that a user is within a threshold proximity of the computing device 102. Other indications of user intent 112 are considered, including, but not limited to, detecting a voice command, detecting a touch input, detecting the lights turning on in a room, and/or detecting a user entering a room.

The authentication control module 132 is also implemented to determine that the additional device 124 is equipped to facilitate authentication of a user to the computing device 102 using an authentication method 134. The authentication method 134 may be any method capable of authenticating a user, including, but not limited to, voice recognition, facial recognition, fingerprint recognition, iris recognition, hand geometry recognition, and so forth. The authentication control module 132 can be implemented to make such a determination based on the computing device 102 being unable to authenticate the user without receiving the additional authentication data 130 from the additional device 124. For instance, the computing device 102 may store the authentication data 116 associated with the user, but may not be equipped with a sensor 110 to facilitate authentication. By way of example, the computing device 102 may store facial information as part of the authentication data 116, but may not be equipped with a camera, which would be needed to obtain an image of the user to perform the authentication method 134 of facial recognition.

In another example, the authentication control module 132 can be implemented to determine that the computing device 102 is unable to authenticate the user based on one or more environmental conditions 114 that prevent detection of user identifiable information 118. For example, the computing device 102 may store facial information and voice information as the user identifiable information 118. The computing device 102 may also be equipped with a camera to capture an image of the user to facilitate the authentication control module 132 performing the authentication method 134 of facial recognition. However, due to a dark environment (e.g., environmental conditions 114) detected by the device sensors 110, the computing device 102 may be unable to authenticate the user with facial recognition.

The authentication control module 132 may select the authentication method 134 based on the one or more environmental conditions 114. As part of this, the additional device 124 may be equipped to perform an authentication method despite the environmental conditions 114 that prevent detection of user identifiable information 118 at the computing device 102. Thus, the additional device 124 may perform the available authentication method 134 to facilitate authentication of the user to the computing device 102. In the example of a dark environment being detected, an authentication method 134 that does not involve a camera may be selected, such as voice recognition. The additional device 124 may be equipped with a microphone, and is thus capable of performing an authentication method using voice recognition despite the dark environment. Therefore, the additional device 124 may collect voice data as the authentication data 128 that is then communicated to the computing device 102 in order to facilitate authentication of the user to the computing device by voice recognition.

The authentication control module 132 can receive additional authentication data 130 associated with the user from the additional device 124. Upon determining that the additional device 124 is equipped to facilitate authentication of the user to the computing device 102 using an authentication method 134, the computing device 102 can communicate an authentication request 126 to the additional device 124. The additional device 124 may then collect authentication data 128 according to the authentication method 134. The collected authentication data 128 may be user identifiable information, similar to the user identifiable information 118 stored at the computing device 102 (e.g., facial information, iris information, voice information, fingerprint information, hand geometry, etc.). The collected authentication data 128 can then be transmitted to the computing device 102 to be received as the additional authentication data 130.

The authentication control module 132 is implemented to authenticate the user to use the computing device 102 based on the additional authentication data 130 received from the additional device 124. For instance, the additional authentication data 130 received from the additional device 124 may be compared to the authentication data 116 stored on computing device 102 to generate an authentication result 136. If the additional authentication data 130 matches the authentication data 116 stored on the computing device 102, then the authentication result 136 is successful and the user may be authenticated to use the computing device 102. Alternatively if the additional authentication data 130 does not match the authentication data 116 stored on the computing device 102, then the authentication result 136 is unsuccessful and the user is not authenticated to use the computing device 102. The authentication may be performed using solely additional authentication data 130 received from the additional device 124, solely authentication data 116 collected by the sensors 110 of the computing device 102, or a combination of the additional authentication data 130 and the authentication data 116 received from the sensors 110 of the computing device 102.

In an example implementation, the additional authentication data 130 may be received as an authenticated user verification 138, which verifies that the user has been authenticated by the additional device 124 to use the additional device. Similar to the computing device 102, the additional device 124 may store authentication data 128 in memory of the additional device. Thus, in response to receiving the authentication request 126 from the computing device 102, the sensors of the additional device 124 may collect identifiable information associated with the user. The identifiable information associated with the user may then be compared to the authentication data 128 stored on the additional device 124. If the identifiable information associated with the user matches the authentication data 128 stored on the additional device 124, then the user may be authenticated to use the additional device 124. Accordingly, the additional device 124 may transmit an authenticated user verification 138 to the computing device 102. The computing device 102 may then authenticate the user based on the authenticated user verification 138 received from the additional device 124.

In another implementation, the computing device 102 may transmit the authentication result 136 to the additional device 124 to be received as an authenticated user notification 140. The authenticated user notification 140 indicates whether the user has been successfully authenticated to use the computing device 102. If the authenticated user notification 140 indicates that the user was successfully authenticated to use the computing device 102, then the additional device 124 may authenticate the user to use the additional device 124 as well. If the authenticated user notification 140 indicates that the user was not successfully authenticated to use the computing device 102, the additional device 124 may then transmit more authentication data 128 to the computing device 102 to assist in authentication.

In another example, the authentication data 128 may be collected at the additional device 124 prior to the computing device 102 receiving an indication of user intent 112 to use the computing device 102. In this example, the user may still be authenticated to use the computing device 102 based on the collected authentication data 128 if the time between collecting the authentication data 128 and receiving the indication of user intent 112 at the computing device 102 is less than a threshold amount. For example, a user may walk by the additional device 124, and the additional device may collect the authentication data 128. The collected authentication data 128 may still be used to facilitate authentication of the user to the computing device 102 if the computing device receives an indication of the user intent 112 to use the computing device 102 within a threshold amount of time (e.g., ten seconds, several minutes, or longer) of the authentication data 128 being collected.

Although these examples are generally described with reference to the authentication control module 132 that is implemented by the computing device 102 performing user authentication of a user to the computing device based on the additional authentication data 130 received from the additional device 124, it should be noted that the described roles of the devices (or alternate devices) may be reversed, in which case the computing device 102 may facilitate authenticating a user to the additional device 124. As further described with reference to FIG. 2 below, the roles of "computing device" or "additional device" may be determined and selected, such as by the authentication control module.

Example methods 200, 300, and 400 are described with reference to respective FIGS. 2, 3, and 4 in accordance with implementations of user authentication facilitated by an additional device. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 2:
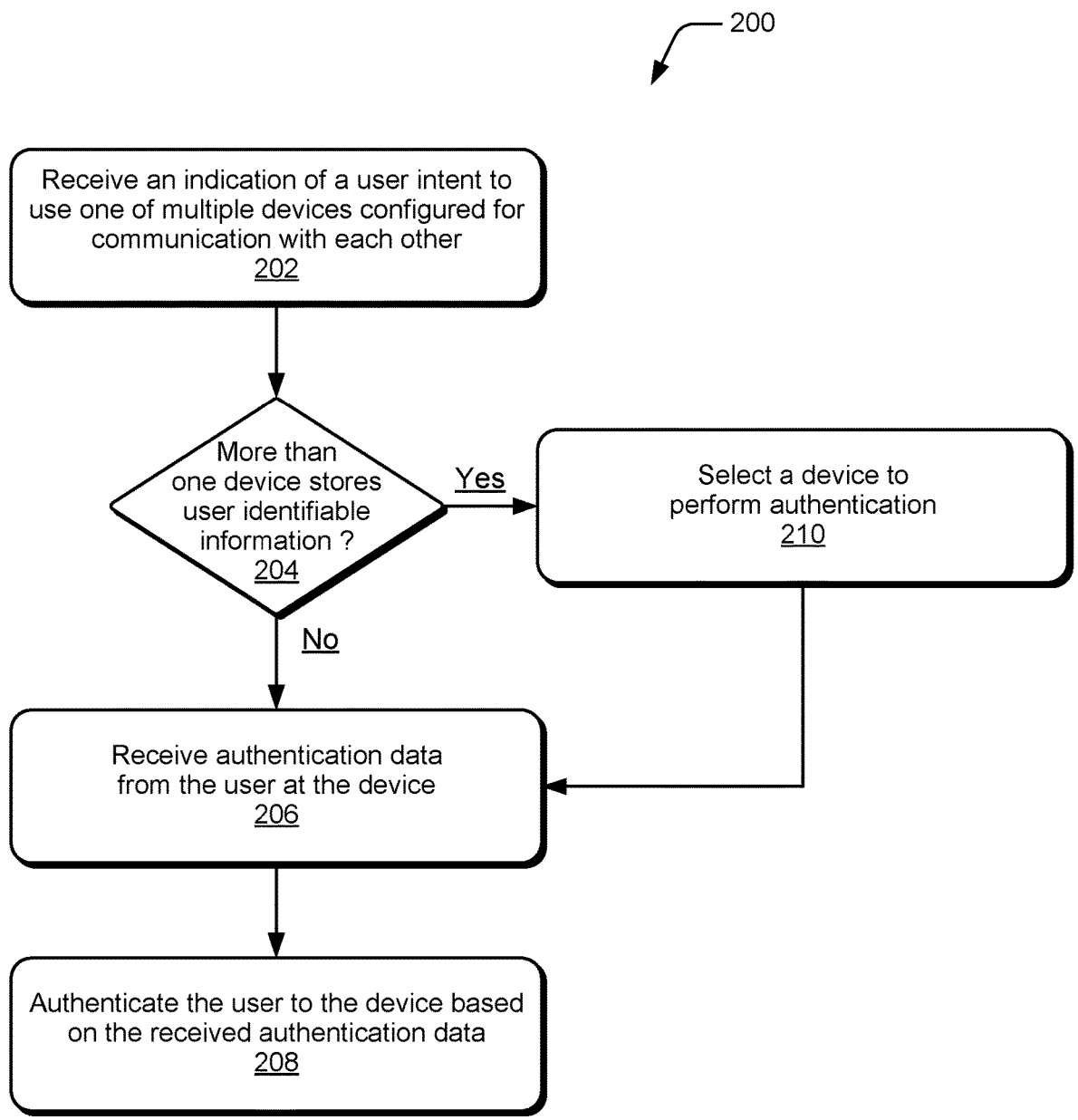
FIG. 2 illustrates an example method of user authentication facilitated by an additional device as implemented in accordance with one or more implementations of the techniques described herein.

FIG. 2 illustrates an example method 200 of user authentication facilitated by an additional device. The order in which the method is described is not intended to be construed as a limitation, and any number or combination of the described method operations can be performed in any order to perform a method, or an alternate method.

At 202, multiple devices in communication with each other receive an indication of a user intent to use one of the devices. For example, the multiple devices may be the computing device 102 and the additional device 124 that communicate via the network 120. Further, the authentication control module 132 that is implemented by the computing device 102 receives the indication of user intent 112 to use the device, as detected or sensed by the sensors 110 of the computing device. The indication of user intent 112 may correspond to sensing a user within a threshold proximity of one or more of the multiple devices. In another example, the user intent can be confirmed when a wearable device containing user credentials communicates the user credentials to another device that the user touches, where the communication between the devices is through body magnetic coupling.

At 204, a determination is made as to whether more than one of the devices stores user identifiable information about the user. For example, the authentication control module 132 that is implemented by the computing device 102 determines which of the multiple devices stores user identifiable information 118 associated with the user. If only one device stores the user identifiable information 118 associated with the user (i.e., "No" from 204), then at 206, the device that stores the user identifiable information receives authentication data from the user. For example, the authentication control module 132 implemented by the computing device 102 can receive authentication data from the user, such as via the sensors 110 of the computing device.

At 208, the device authenticates the user based on the received authentication data. For example, the authentication control module 132 implemented by the computing device 102 compares the authentication data received from the user (and/or compares the additional authentication data 130 received from the additional device 124) to the user identifiable information 118 that is stored in the device memory 106 of the computing device.

If more than one of the multiple devices stores the user identifiable information 118 associated with the user (i.e., "Yes" from 204), then at 210, a device is selected to perform the authentication of the user. For example, the authentication control module 132 implemented by the computing device 102 can select which of the multiple devices will authenticate the user based on the authentication data 116 and/or based on the additional authentication data 130. In implementations, the computing device 102 may be selected as the authenticating device based on the amount of time the user interacts with each of the devices and/or based on the number of times that the devices have authenticated the user with the authentication method 134. Notably, the authentication data can be collected from or about the user based on whether sensors of the respective devices are unobstructed and configured to obtain particular types of authentication data. For instance, if the camera of the computing device 102 is obstructed (e.g., a mobile phone is in a user's pocket), then the additional device 124 may capture facial image data from the user. Similarly, a microphone of the additional device 124 may be canceled out by surrounding noise in the environment, and the computing device 102 may be selected to collect the voice data from the user.

The method continues a 206 to receive the authentication data from the user, and at 208 to authenticate the user to the selected device based on the received authentication data. In implementations, one device may be implemented as the computing device 102 to perform authentication for a user. For example, a smartphone of a user may store all of the needed user identifiable information 118 associated with the user, and as such, is capable of performing all of the authentication methods 134 for that user. The user's smartphone may then act as the computing device 102 for all authentication involving that user and receive authentication data from other devices.

Figure 3:
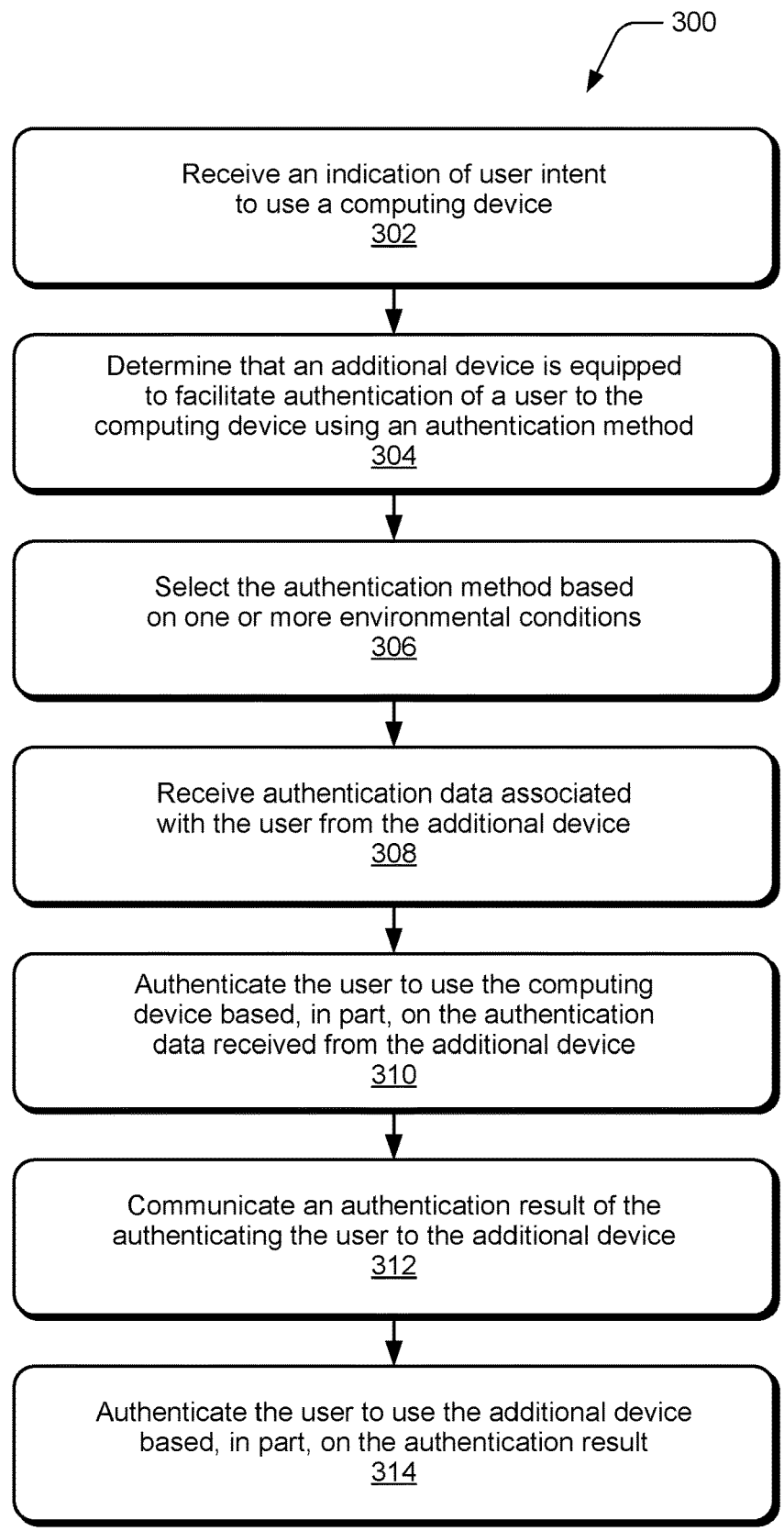
FIG. 3 illustrates an example method of user authentication facilitated by an additional device as implemented in accordance with one or more implementations of the techniques described herein.

FIG. 3 illustrates example method(s) 300 of user authentication facilitated by an additional device, and is generally described with reference to an authentication control module implemented by a computing device. The order in which the method is described is not intended to be construed as a limitation, and any number or combination of the described method operations can be performed in any order to perform a method, or an alternate method.

At 302, an indication of user intent to use a computing device is received. For example, the authentication control module 132 implemented by the computing device 102 receives the indication of user intent 112 to use the computing device, as detected or sensed by the sensors 110 implemented in the computing device 102. The indication of the user intent 112 to use the computing device 102 can be based on the sensors 110 detecting the user within a threshold distance of the computing device 102. By way of example, the sensors 110 may detect or sense that a user is within a close proximity (e.g., within a threshold proximity) of the computing device 102, and determine that the user wishes to use the computing device 102.

At 304, an additional device equipped to facilitate authentication of a user to the computing device using an authentication method is determined. For example, the authentication control module 132 implemented by the computing device 102 determines that the additional device 124 is equipped to facilitate authentication of a user to the computing device. In implementations, the authentication control module 132 can determine that the computing device is unable to authenticate the user without the additional authentication data 130 received from the additional device 124, such as due to one or more environmental conditions 114 that prevent detection of user identifiable information 118 corresponding to the user.

At 306, the authentication method is selected based on the one or more environmental conditions. For example, the authentication control module 132 implemented by the computing device 102 selects the authentication method 134 based on the one or more environmental conditions 114. The device sensors 110 can detect the environmental conditions 114 associated with an environment in which the computing device 102 is located. For example, the sensors 110 can detect the environmental conditions 114 that correspond to an amount of noise, an amount of light, or any other environmental conditions 114 associated with the environment in which the computing device 102 is located.

At 308, authentication data associated with the user is received from the additional device. For example, the authentication control module 132 implemented by the computing device 102 receives the additional authentication data 130 associated with the user from the additional device 124. The additional authentication data 130 can be received as the user identifiable information 118 from the additional device 124. In other implementations, the additional authentication data 130 is received as an authenticated user verification 138 that the user has been authenticated by the additional device 124 for the user to use the computing device 102.

At 310, the user is authenticated to use the computing device based, in part, on the authentication data received from the additional device. For example, the authentication control module 132 implemented by the computing device 102 authenticates the user to use the computing device based, in part, on the additional authentication data 130 received from the additional device 124. The authentication control module 132 can authenticate the user based on a threshold amount of time between the authentication data being obtained at the additional device 124 and receiving the indication of the user intent 112 to use the computing device 102. In this implementation, the authentication data may be obtained at the additional device 124 at a first moment in time, and the indication of the user intent 112 may be received at the computing device 102 at a second moment in time. The authentication control module 132 is implemented to authenticate the user to use the computing device 102 if the difference between the first moment in time and the second moment in time is within a threshold amount of time.

At 312, an authentication result of the authenticating the user is communicated to the additional device. For example, the authentication control module 132 initiates the computing device 102 communicating the authentication result 136 of the user authentication to the additional device 124. At 314, the user is authenticated to use the additional device based, in part, on the authentication result. For example, the authentication control module 132 implemented by the computing device 102 can authenticate the user to use the additional device 124 based, in part, on the authentication result 136.

Figure 4:
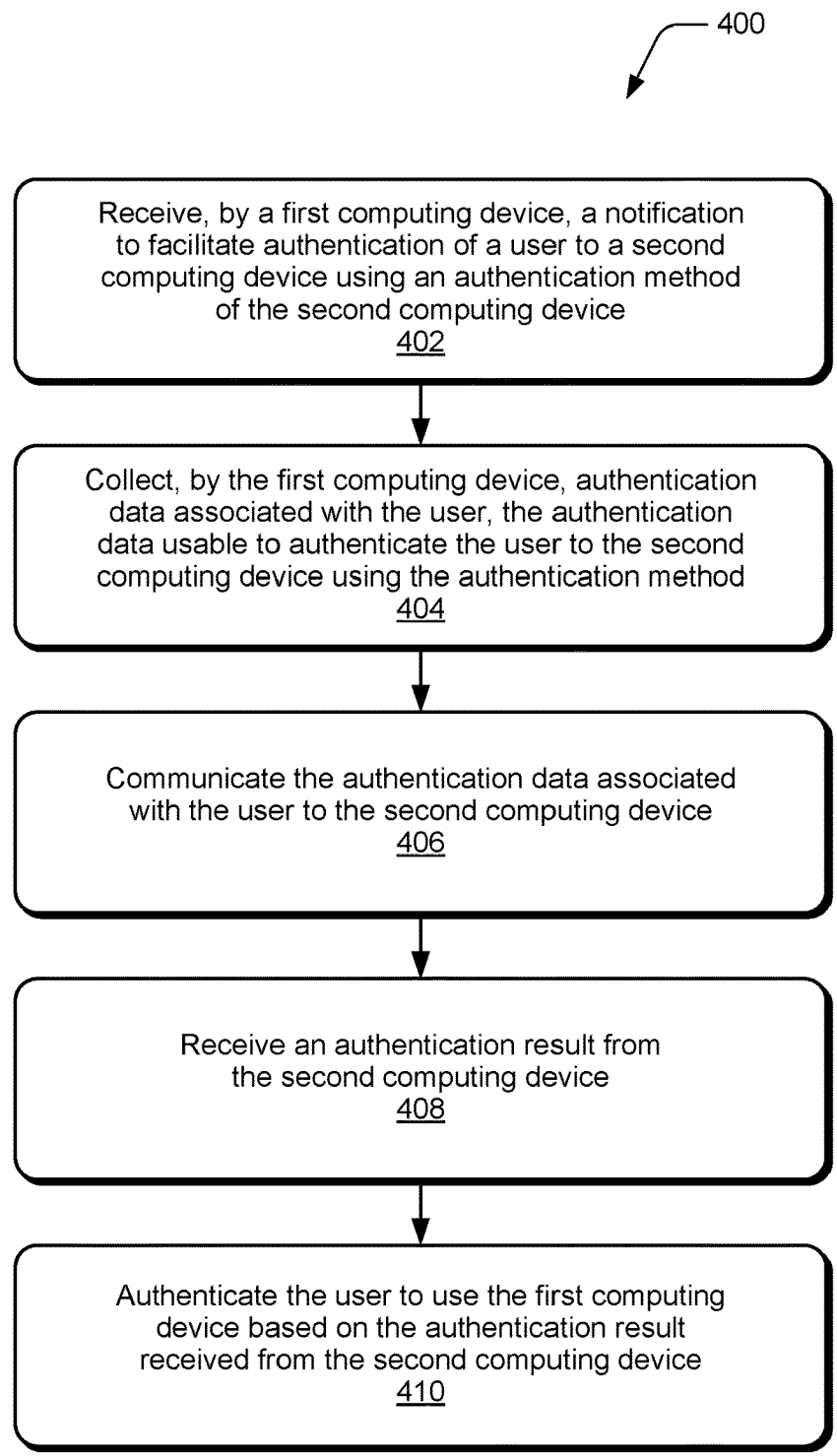
FIG. 4 illustrates an example method of user authentication facilitated by an additional device as implemented in accordance with one or more implementations of the techniques described herein.

FIG. 4 illustrates example method(s) 400 of user authentication facilitated by an additional device, and is generally described with reference to an authentication control module implemented by a computing device. The order in which the method is described is not intended to be construed as a limitation, and any number or combination of the described method operations can be performed in any order to perform a method, or an alternate method.

At 402, a first computing device receives a notification to facilitate authentication of a user to a second computing device using an authentication method of the second computing device. For example, the additional device 124 receives the authentication request 126 from the computing device 102 as a notification to facilitate authentication of a user to the computing device using an authentication method 134 of the computing device. The authentication control module 132 may transmit the authentication request 126 to the additional device 124 in response to a determination that the computing device 102 is unable to collect the authentication data necessary to authenticate the user to the computing device using the authentication method 134.

At 404, the first computing device collects authentication data associated with the user, where the authentication data is usable to authenticate the user to the second computing device using the authentication method. For example, the additional device 124 collects the authentication data 128 that is associated with the user, and the authentication data collected by the additional device 124 is usable to authenticate the user to use the computing device 102 using the authentication method 134 at the computing device.

At 406, the authentication data associated with the user is communicated to the second computing device. For example, the additional device 124 communicates the authentication data 128 that is associated with the user to the computing device 102. The authentication data 128 can be communicated as an authenticated user verification 138 that indicates the user has been authenticated by the additional device 124 to use the computing device 102. The authentication data 128 can be communicated based on a threshold amount of time between collecting the authentication data 128 associated with the user, and receiving the authentication request 126 as a notification to facilitate authentication of the user.

At 408, an authentication result is received from the second computing device. For example, the additional device 124 receives the authenticated user notification 140 from the computing device 102 as an authentication result of the authentication method 134 performed or initiated by the authentication control module 132 to authenticate the user to the computing device. At 410, the user is authenticated to use the first computing device based on the authentication result received from the second computing device. For example, the additional device 124 can authenticate the user to use the additional device based on the authenticated user notification 140 received from the computing device 102.

Figure 5:
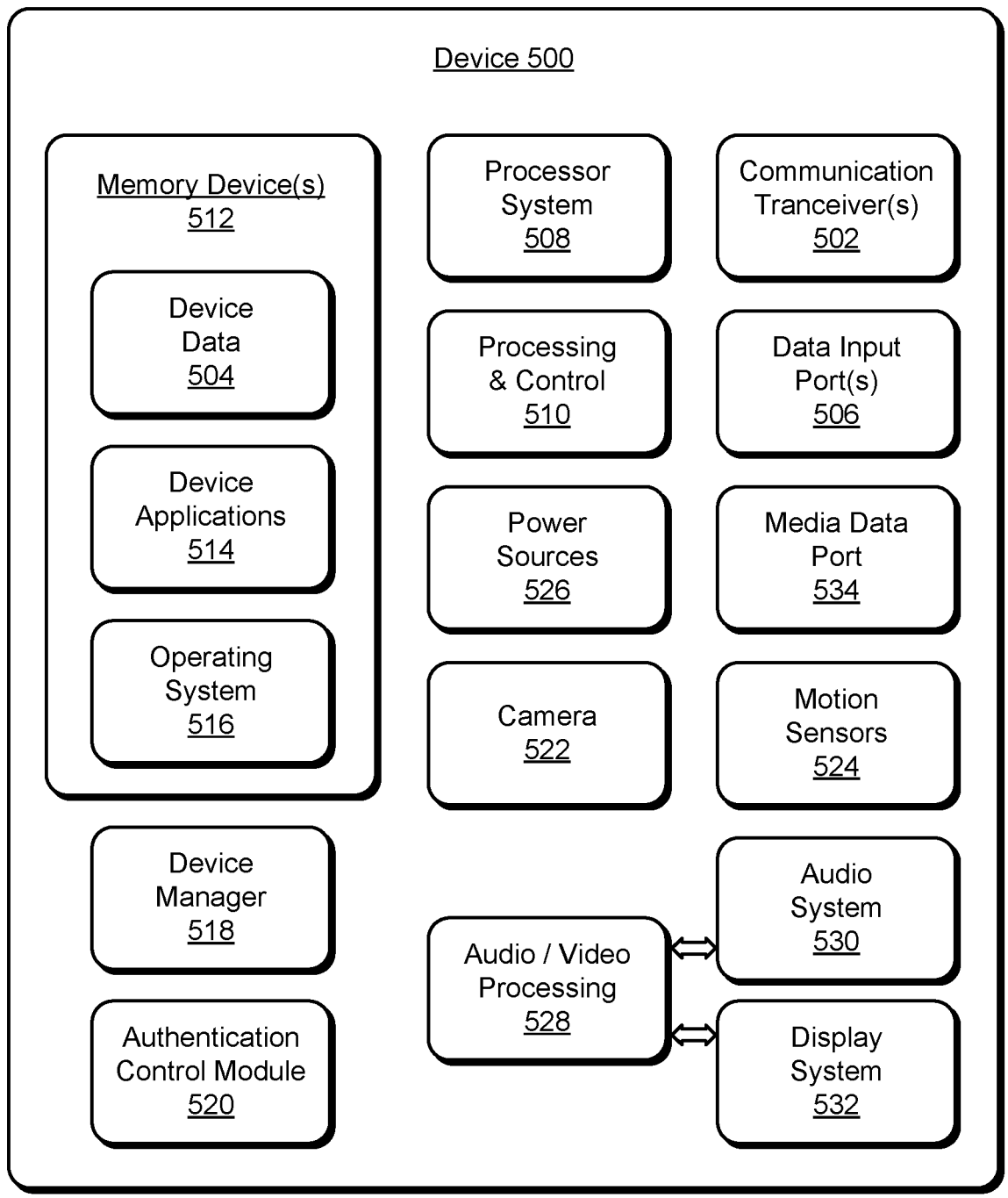
FIG. 5 illustrates various components of an example device that can used to implement the techniques of user authentication facilitated by an additional device as described herein.

FIG. 5 illustrates various components of an example device 500, in which aspects of user authentication facilitated by an additional device can be implemented. The example device 500 can be implemented as any of the devices described with reference to the previous FIGS. 1-4, such as any type of a mobile device, mobile phone, client device, companion device, paired device, display device, tablet, computing, communication, entertainment, gaming, media playback, and/or any other type of computing and/or electronic device, to include IoT devices. For example, the computing device 102 and/or the additional device 124 described with reference to FIG. 1 may be implemented as the example device 500.

The device 500 includes communication transceivers 502 that enable wired and/or wireless communication of device data 504 with other devices. The device data 504 can include any of the various devices and authentication control module generated, stored, and/or determined data. Additionally, the device data 504 can include any type of audio, video, and/or image data. Example communication transceivers 502 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processor system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 (e.g., memory devices) that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processor system 508. The device applications may also include a device manager 518, such as any form of a control application, software application, signal-processing and control module, code that is native to a particular device, a hardware abstraction layer for a particular device, and so on.

In this example, the device 500 includes an authentication control module 520 that implements aspects of user authentication facilitated by an additional device. The authentication control module 520 may be implemented with hardware components and/or in software as one of the device applications 514, such as when the device 500 is implemented as the computing device 102 or additional device 124 described with reference to FIG. 1. Examples of the authentication control module 520 include the authentication control module 132 that is implemented by the computing device 102, such as a software application and/or as hardware components in the computing device. In implementations, the authentication control module 520 may include independent processing, memory, and logic components as a computing and/or electronic device integrated with the example device 500.

In this example, the device 500 also includes a camera 522 and motion sensors 524, such as may be implemented as components of an inertial measurement unit (IMU). The motion sensors 524 can be implemented with various sensors, such as a gyroscope, an accelerometer, and/or other types of motion sensors to sense motion of the device. The motion sensors 524 can generate sensor data vectors having three-dimensional parameters (e.g., rotational vectors in x, y, and z-axis coordinates) indicating location, position, acceleration, rotational speed, and/or orientation of the device. The device 500 can also include one or more power sources 526, such as when the device is implemented as a mobile device. The power sources may include a charging and/or power system, and can be implemented as a flexible strip battery, a rechargeable battery, a charged super-capacitor, and/or any other type of active or passive power source.

The device 500 can also include an audio and/or video processing system 528 that generates audio data for an audio system 530 and/or generates display data for a display system 532. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 534. In implementations, the audio system and/or the display system are integrated components of the example device. Alternatively, the audio system and/or the display system are external, peripheral components to the example device.

Although implementations of user authentication facilitated by an additional device have been described in language specific to features and/or methods, the subject of the appended claims is not necessarily limited to the specific features or methods described. Rather, the specific features and methods are disclosed as example implementations of user authentication facilitated by an additional device, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: receiving an indication of user intent to use a computing device; determining that an additional device is equipped to facilitate authentication of a user to the computing device using an authentication method; receiving authentication data associated with the user from the additional device; and authenticating the user to use the computing device based, in part, on the authentication data received from the additional device.

Alternatively or in addition to the above described method, any one or combination of: the determining is based on the computing device being unable to authenticate the user without the authentication data received from the additional device. The computing device is unable to authenticate the user due to one or more environmental conditions that prevent detection of user identifiable information. The method further comprising selecting the authentication method based on the one or more environmental conditions. The authentication data is received as user identifiable information from the additional device. The authentication data is received as a verification that the user has been authenticated by the additional device for the user to use the computing device. The authenticating is based on a threshold amount of time between the authentication data being obtained at the additional device and the receiving the indication of the user intent to use the computing device. The indication of the user intent to use the computing device is based on detecting the user within a threshold distance of the computing device. The method further comprising communicating an authentication result of the authenticating the user to the additional device. The method further comprising authenticating the user to use the additional device based, in part, on the authentication result.

A computing device, comprising: a memory to maintain authentication data usable to authenticate a user to use the computing device; an authentication control module implemented at least partially in computer hardware to: receive an indication of user intent to use the computing device; determine that an additional device is equipped to facilitate authentication of a user to the computing device; receive additional authentication data associated with the user from the additional device; and authenticate the user to use the computing device based, in part, on the additional authentication data received from the additional device.

Alternatively or in addition to the above described computing device, any one or combination of: the authentication control module is implemented to select the computing device from multiple devices based on which of the multiple devices stores identifiable information about the user. The authentication control module is implemented to select the computing device based on an amount of time that the user interacts with each of the multiple devices. The authentication control module is implemented to determine user intent to use the multiple devices based on the user being detected within a threshold distance of the multiple devices. The authentication control module is implemented to select the additional device to facilitate authentication of the user to the computing device based on a determination that an authentication method of the computing device is unavailable based on one or more environmental conditions.

A method, comprising: receiving, by a first computing device, a notification to facilitate authentication of a user to a second computing device using an authentication method of the second computing device; collecting, by the first computing device, authentication data associated with the user, the authentication data usable to authenticate the user to the second computing device using the authentication method; and communicating the authentication data associated with the user to the second computing device.

Alternatively or in addition to the above described method, any one or combination of: receiving the notification to facilitate authentication of the user is responsive to a determination that the second computing device is unable to collect the authentication data necessary to authenticate the user to the second computing device using the authentication method. The authentication data is communicated as a verification that the user has been authenticated by the first computing device to use the second computing device. Communicating the authentication data is based on a threshold amount of time between collecting the authentication data associated with the user, and receiving the notification to facilitate authentication of the user. The method further comprising receiving an authentication result from the second computing device; and authenticating the user to use the first computing device based on the authentication result received from the second computing device.

The invention claimed is:

1. A method, comprising:
   receiving an indication of user intent to use a computing device that is unable to receive authentication data from a user to authenticate the user;
   determining that an additional device is equipped to facilitate authentication of the user to the computing device using an authentication method;
   selecting, by an authentication control module, the additional device from multiple devices based on which of the multiple devices stores identifiable information about the user;
   receiving the authentication data associated with the user from the additional device; and
   authenticating the user to use the computing device based at least in part on the authentication data received from the additional device.

2. The method of claim 1, wherein the determining is based on the computing device being unable to authenticate the user without the authentication data received from the additional device.

3. The method of claim 2, wherein the computing device is unable to authenticate the user due to one or more environmental conditions that prevent detection of the identifiable information about the user.

4. The method of claim 3, further comprising:
   selecting the authentication method based on the one or more environmental conditions.

5. The method of claim 1, wherein the authentication data is received as the identifiable information about the user from the additional device.

6. The method of claim 1, wherein the authentication data is received as a verification that the user has been authenticated by the additional device for the user to use the computing device.

7. The method of claim 1, wherein the authenticating is based on a threshold amount of time between the authentication data being obtained at the additional device and the receiving the indication of the user intent to use the computing device.

8. The method of claim 1, wherein the indication of the user intent to use the computing device is based on detecting the user within a threshold distance of the computing device.

9. The method of claim 1, further comprising:
   communicating an authentication result of the authenticating the user to the additional device.

10. The method of claim 9, further comprising:
    authenticating the user to use the additional device based at least in part on the authentication result.

11. A computing device, comprising:
    a memory to maintain authentication data usable to authenticate a user to use the computing device; and
    an authentication control module implemented at least partially in computer hardware to:
    receive an indication of user intent to use the computing device that is unable to receive the authentication data from the user to authenticate the user;
    select an additional device that is equipped to facilitate authentication of the user to the computing device, the additional device selected from multiple devices based on which of the multiple devices stores identifiable information about the user;
    receive additional authentication data associated with the user from the additional device; and
    authenticate the user to use the computing device based at least in part on the additional authentication data received from the additional device.

12. The computing device of claim 11, wherein the authentication control module is implemented to select the additional device based on an amount of time that the user interacts with each of the multiple devices.

13. The computing device of claim 11, wherein the authentication control module is implemented to determine the user intent to use the multiple devices based on the user being detected within a threshold distance of the multiple devices.

14. The computing device of claim 11, wherein the authentication control module is implemented to select the additional device to facilitate the authentication of the user to the computing device based on a determination that an authentication method of the computing device is unavailable based on one or more environmental conditions.

15. A method, comprising:
- receiving, by a first computing device, a notification to facilitate authentication of a user to a second computing device using an authentication method of the second computing device, the second computing device unable to receive authentication data from the user to authenticate the user;
- selecting, by an authentication control module, the first computing device from multiple devices based on which of the multiple devices stores identifiable information about the user;
- collecting, by the first computing device, the authentication data associated with the user, the authentication data usable to authenticate the user to the second computing device using the authentication method; and
- communicating the authentication data associated with the user to the second computing device.

16. The method of claim 15, wherein receiving the notification to facilitate the authentication of the user is responsive to a determination that the second computing device is unable to collect the authentication data necessary to authenticate the user to the second computing device using the authentication method.

17. The method of claim 15, wherein the authentication data is communicated as a verification that the user has been authenticated by the first computing device to use the second computing device.

18. The method of claim 15, wherein communicating the authentication data is based on a threshold amount of time between collecting the authentication data associated with the user, and receiving the notification to facilitate the authentication of the user.

19. The method of claim 15, further comprising:
- receiving an authentication result from the second computing device; and
- authenticating the user to use the first computing device based on the authentication result received from the second computing device.

20. The method of claim 15, wherein the authentication data is communicated as the identifiable information about the user.

* * * * *